(12) United States Patent
Deng et al.

(10) Patent No.: US 10,248,788 B2
(45) Date of Patent: Apr. 2, 2019

(54) DETECTING HARMFUL APPLICATIONS PRIOR TO INSTALLATION ON A USER DEVICE

(71) Applicant: INTERNATIONAL BUSINESS MACHINES CORPORATION, Armonk, NY (US)

(72) Inventors: Yu Deng, Yorktown Heights, NY (US); Quang C. Duong, Tampa, FL (US); Jenny S. Li, Danbury, CT (US); Min Li, San Jose, CA (US); Theresa Y. Tai, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 219 days.

(21) Appl. No.: 15/194,960

(22) Filed: Jun. 28, 2016

(65) Prior Publication Data

US 2017/0372066 A1    Dec. 28, 2017

(51) Int. Cl.
*G06F 8/61* (2018.01)
*G06F 8/71* (2018.01)
*G06F 21/56* (2013.01)

(52) U.S. Cl.
CPC .............. *G06F 21/562* (2013.01); *G06F 8/61* (2013.01); *G06F 8/71* (2013.01); *G06F 2221/033* (2013.01)

(58) Field of Classification Search
CPC . G06F 21/562; G06F 8/65; G06F 8/71; G06F 2221/033
USPC .......................................................... 726/23
See application file for complete search history.

(56) References Cited

U.S. PATENT DOCUMENTS

| | | | |
|---|---|---|---|
| 8,788,944 B1 | 7/2014 | Gill et al. | |
| 8,806,647 B1 | 8/2014 | Daswani et al. | |
| 8,832,841 B2 | 9/2014 | Archer et al. | |
| 9,063,964 B2 | 6/2015 | Dublin et al. | |
| 9,152,694 B1 | 10/2015 | Padidar et al. | |
| 9,158,919 B2 | 10/2015 | Fortier | |
| 9,223,831 B2 | 12/2015 | Baker et al. | |
| 9,288,226 B2 | 3/2016 | Ben-Itzhak et al. | |
| 9,626,509 B1 * | 4/2017 | Khalid | G06F 21/53 |

(Continued)

OTHER PUBLICATIONS

Gao, et al. PAID: Prioritizing App Issues for Developers by Tracking User Reviews Over Versions, Shenzhen Research Institute, pp. 35-45, IEEE, 2015.

(Continued)

*Primary Examiner* — Kambiz Zand
*Assistant Examiner* — Mahabub S Ahmed
(74) *Attorney, Agent, or Firm* — Cantor Colburn LLP; William Kinnaman

(57) ABSTRACT

Examples of techniques for detecting harmful applications prior to installation on a user device are disclosed. In one example implementation according to aspects of the present disclosure, a computer-implemented method includes: analyzing, by a processing device, a plurality of reviews for each version of a plurality of versions of an application to determine, based on each of the plurality of reviews, whether each version of the plurality of versions is harmful; and responsive to determining that a particular version of the plurality of versions is harmful, preventing a user from installing the particular version.

19 Claims, 5 Drawing Sheets

(56) References Cited

U.S. PATENT DOCUMENTS

| | | | |
|---|---|---|---|
| 2008/0120611 A1* | 5/2008 | Aaron | G06F 21/51 717/174 |
| 2008/0148381 A1* | 6/2008 | Aaron | H04L 63/029 726/11 |
| 2011/0145920 A1* | 6/2011 | Mahaffey | G06F 21/564 726/22 |
| 2012/0110174 A1* | 5/2012 | Wootton | G06F 21/564 709/224 |
| 2012/0167219 A1* | 6/2012 | Zaitsev | G06F 21/56 726/24 |
| 2013/0086682 A1* | 4/2013 | Mahaffey | G06F 21/564 726/23 |
| 2013/0212684 A1* | 8/2013 | Li | G06F 17/30522 726/25 |
| 2014/0096246 A1* | 4/2014 | Morrissey | G06F 21/51 726/23 |
| 2014/0351933 A1 | 11/2014 | Kim et al. | |
| 2015/0058826 A1 | 2/2015 | Hu et al. | |
| 2015/0169877 A1 | 6/2015 | Mahaffey et al. | |
| 2015/0180908 A1 | 6/2015 | Dang et al. | |
| 2015/0205656 A1 | 7/2015 | Huang | |
| 2015/0289021 A1 | 10/2015 | Miles | |
| 2015/0363289 A1 | 12/2015 | Brough | |
| 2016/0330219 A1* | 11/2016 | Hasan | G06N 99/005 |

OTHER PUBLICATIONS

Matsuda, et al., a Proposal of Security Advisory System at the Time of the Installation of Applications on Android OS, 2012 15th International Conference on Network-Based Information Systems, pp. 261-267, IEEE, 2012.

Vu, et al., Mining Usser Opinions in Mobile App Reviews: A Keyword-based Approach, 30th IEEE/ACM International Conference on Automated Software Engineering, pp. 749-759, IEEE, 2015.

* cited by examiner

DETECTING HARMFUL APPLICATIONS PRIOR TO INSTALLATION ON A USER DEVICE

BACKGROUND

The present disclosure relates generally to software applications for a user device and, more particularly, to detecting harmful applications prior to installation on a user device.

Users may utilize a variety of devices ("user devices") such as smart phones, laptops, tablets, desktops, wearable devices, and other processing systems. A user may install applications on his user device to add functionality to the user device. However, a user may be unsure whether a particular application is safe to install. Some applications may contain harmful code that may enable a hacker to access the user device. Other applications may be unstable and may cause the user device to crash or otherwise become inoperable.

SUMMARY

According to examples of the present disclosure, techniques including methods, systems, and/or computer program products for detecting harmful applications prior to installation on a user device are provided. An example method may include: analyzing, by a processing device, a plurality of reviews for each version of a plurality of versions of an application to determine, based on each of the plurality of reviews, whether each version of the plurality of versions is harmful; and responsive to determining that a particular version of the plurality of versions is harmful, preventing a user from installing the particular version.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Various implementations are described below by referring to several examples of detecting harmful applications prior to installation on a user device. For example, a user may desire to install an application such as a retail store loyalty card application. The user searches for the application in an application store ("app store") and locates the desired retail store loyalty card application. The application has a high rating from other users, and many of the reviews are positive. The user installed the application and it crashed the user device of the user completely, rendering the user device inoperable. The present techniques provide improved detection of harmful applications to prevent this scenario from occurring.

In some implementations, the present techniques improve the functioning of a processing system (i.e., a user device) by preventing the user device from installing harmful applications. In particular, the present techniques improve the functioning of a processing system by protecting the processing system from harmful applications and by preventing a user from installing potentially harmful applications. The present techniques also monitor applications already installed on user devices and prevent the user devices from installing harmful updates that may negatively impact the processing system.

The present techniques notify a user when the user attempts to install a potentially harmful application at the time of installation and prevents the user from installing an application or upgrading to a new version of an existing application that may be harmful. The present techniques also present to a user any critical complaints/reviews that may indicate the harmfulness of the application. The present techniques also provide recommendations as to whether an application is safe to install. Finally, the present techniques provide continuous monitoring of installed applications for users to determine if any installed application has become unsafe to use. These and other advantages will be apparent from the description that follows.

Figure 1:
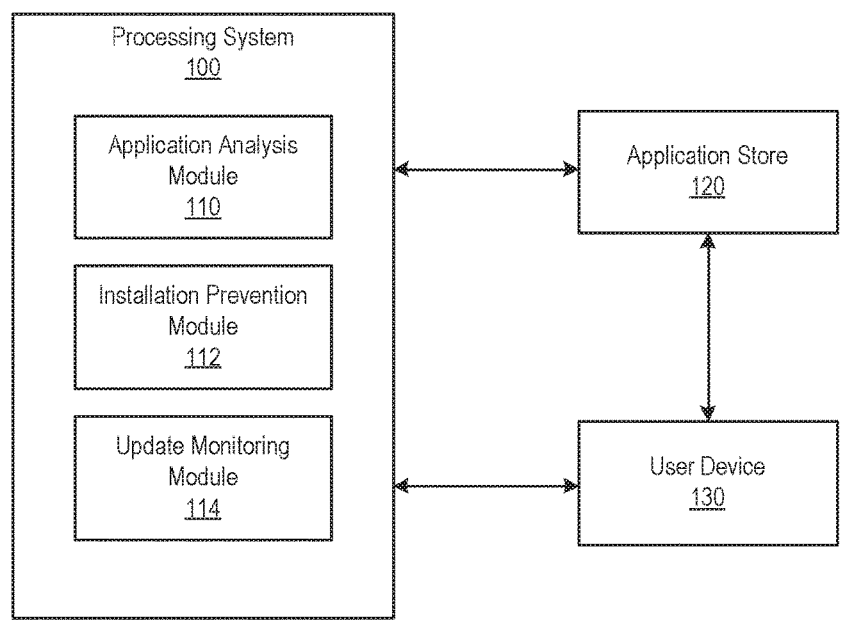
FIG. 1 illustrates a block diagram of a processing system 100 for detecting harmful applications prior to installation on a user device according to examples of the present disclosure.

FIG. 1 illustrates a block diagram of a processing system 100 for detecting harmful applications prior to installation on a user device according to examples of the present disclosure. The various components, modules, engines, etc. described regarding FIG. 1 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include a processing device for executing those instructions. Thus, a system memory can store program instructions that when executed by the processing device implement the engines described herein. Other engines may also be utilized to include other features and functionality described in other examples herein.

Processing system 100 may include an application analysis module 110 an installation prevention module 112, and an update monitoring module 114. Alternatively or additionally, the processing system 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Application store 120 contains applications that a user of the user device 130 may search, download, and install on the user device 130. The user device 130 may be a smart phone, a laptop, a tablet, a desktop, a wearable device, and/or another processing system that runs the applications. Each application may have multiple versions and may also have ratings and reviews from other users.

The ratings and reviews may be associated with the multiple versions. For example, an overall rating may be associated with each application. However, the overall rating may not be helpful to determine whether a particular version of the application is harmful because the overall rating could include reviews/ratings over multiple versions of the same application. For example, 100 people may rate an application, with 95 of the ratings being high (i.e., the users were satisfied with an old version of the application and gave high ratings), and with 5 of the ratings being low (i.e., the users were not satisfied with a new version of the application and gave low ratings). In this case, the overall rating may be very high, but the overall rating does not provide a true reflection as to the potential harmfulness of an application.

The application analysis module 110 analyzes a plurality of reviews for each version of a plurality of versions of an application to determine, based on each of the plurality of reviews, whether each version of the plurality of versions is harmful. The application analysis module 110 may identify timestamps associated with new version releases and can analyze user ratings/reviews for the different versions to determine whether each version is harmful.

In examples, the application analysis module 110 analyzes a plurality of ratings for each version, and plurality of reviews for each version, or both. According to aspects of the present disclosure, the application analysis module 110 analyzes the plurality of reviews to identify a version with which each of the plurality of reviews is associated, identifies a subset of the plurality of reviews that indicate that the version identified includes a harmful feature, and presents the subset of the plurality of reviews to the user.

Identifying the subset may include performing a keyword search on the plurality of reviews to identify keywords that indicate the harmful feature. Keywords such as "crash," "destroy," "unstable," "critical," "frozen," "restart," "not responsive," "leak," "overflow," "warning," "do not install," "delete," and the like may be indicative of a harmful application (or version).

The installation prevention module 112 prevents a user from installing the particular version responsive to determining that a particular version of the plurality of versions is harmful. The installation prevention module 112 may warn the user that the particular version is harmful.

In some examples, the processing system 100 includes an update monitoring module that monitors an installed application on a user device of the user to determine whether the installed application is to be upgraded to a new version. In such examples, the application analysis module 110 analyzes a plurality of reviews for the new version of the installed application to determine, based on each of the plurality of reviews, whether the new version is harmful. The installation prevention module 112 prevents a user from installing the new version responsive to determining that the new version is harmful.

One implementation of the techniques described herein may occur as follows. User_1 installs App_v1.0 on her user device 130 from the application store 120 and everything works fine. Later, User_2 installs App_v1.2 on his user device, which causes User_2's user device to crash. User_2 writes a bad review of App_v1.2 in the application store: "Don't install it, wiped out all my contact list." User_1 is thereafter prompted to upgrade to App_v1.2. The processing system 100 determines that App_v1.2 is potentially harmful based on User_2's review and warns User_1 not to upgrade because of User_2's bad review.

Another implementation of the techniques described herein may occur as follows. User_1 installs App_v1.0 on her user device 130 from the application store 120 and everything works fine. Later, User_2 installs App_v1.0 on his user device, which causes User_2's user device to crash. User_2 writes a bad review of App_v1.2 in the application store: "Don't install it, wiped out all my contact list." User_3 searches for App_v1.0 in the application store 120. The processing system 100 determines that App_v1.0 is potentially harmful based on User_2's review and warns User_3 not to install App_v1.0 because of User_2's bad review. In some examples, an indicator is displayed along with App_v1.0 in the application store 120 indicating that it is potentially harmful. For example, the application may appear in red font if it is harmful and green font if it is not harmful. Other indicia may be used.

Figure 2:
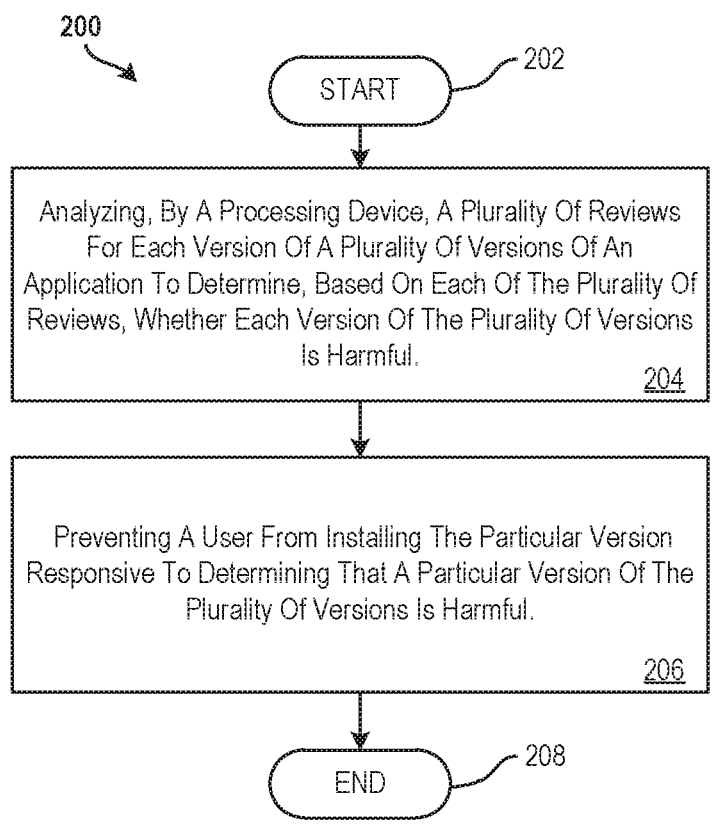
FIG. 2 illustrates a flow diagram of a method for determining whether an application is harmful prior to installation of the application on a processing system according to examples of the present disclosure.

FIG. 2 illustrates a flow diagram of a method 200 for determining whether an application is harmful prior to installation of the application on a processing system according to examples of the present disclosure. The method 200 begins at block 202 and continues to block 204.

At block 204, the method 200 comprises analyzing, by a processing device, a plurality of reviews for each version of a plurality of versions of an application to determine, based on each of the plurality of reviews, whether each version of the plurality of versions is harmful.

At block 206, the method 200 comprises preventing a user from installing the particular version responsive to determining that a particular version of the plurality of versions is harmful. The method 200 continues to block 208 and terminates.

Additional processes also may be included, and it should be understood that the processes depicted in FIG. 2 represent illustrations, and that other processes may be added or existing processes may be removed, modified, or rearranged without departing from the scope and spirit of the present disclosure.

Figure 3:
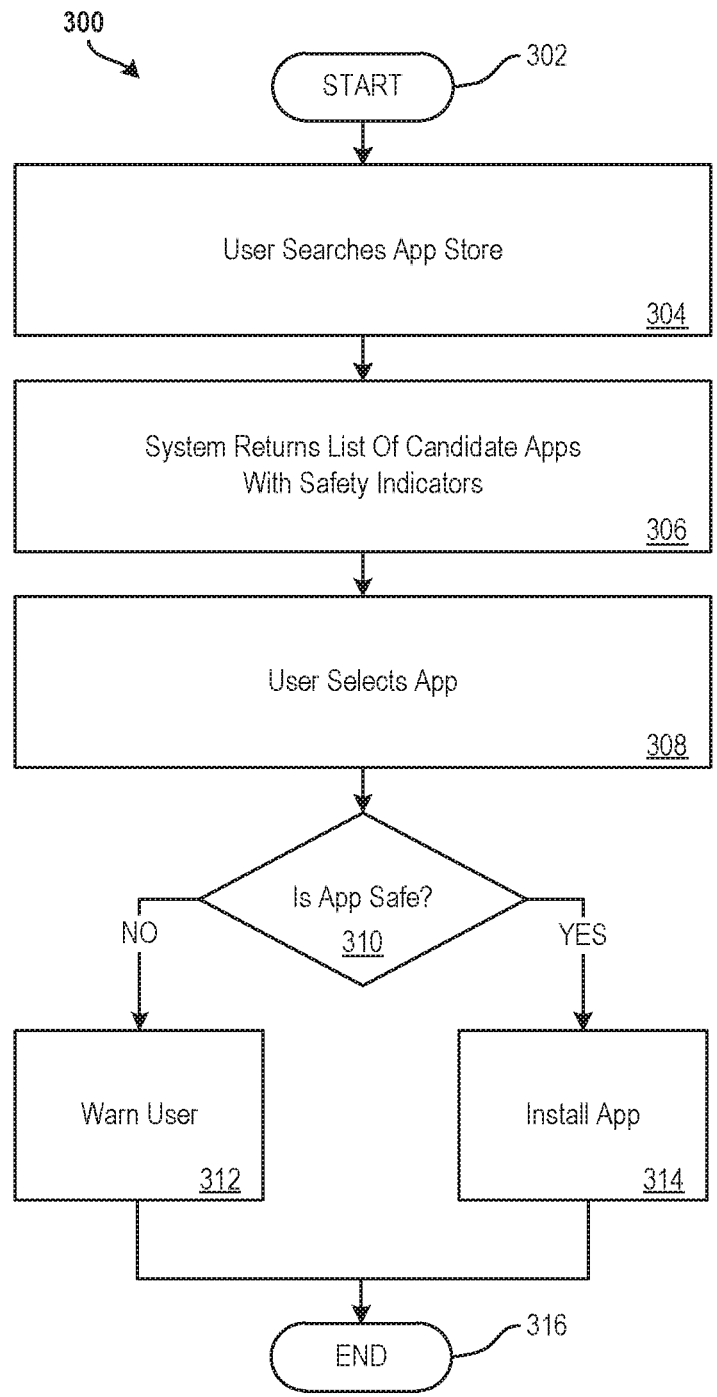
FIG. 3 illustrates a flow diagram of a method for determining whether an application is harmful prior to installation of the application on a processing system according to examples of the present disclosure.

FIG. 3 illustrates a flow diagram of a method 300 for determining whether an application is harmful prior to installation of the application on a processing system according to examples of the present disclosure. The method 300 begins at block 302 and continues to block 304.

At block 304, the method 300 comprises a user searching an application store for an application. The user may search in a variety of ways, such as by keyword, category, title, function, or other criteria. For example, a user may search for "photo editor" if the user desires to install a photo editing application.

At block 306, the method 300 comprises returning a list of candidate applications with safety indicators. For example, a list of the top ten applications based on user ratings may be returned. Each of the applications may have a safety indicator associated therewith. A safety indicator may be a rating (e.g., between 1 and 5 with 5 being the safest), a risk level (e.g., low, moderate, high), or other indicia indicating the safety of the application.

At block 308, the method 300 comprises the user selecting the application that the user desires to install, such as by selecting an "install" option on the desired application.

At decision block 310, the method 300 comprises determining whether the application is safe.

If it is determined at decision block 310 that the application is safe, the application is installed on the user's device at block 314. The method 300 proceeds to block 316 and ends.

If, however, it is determined at decision block 310 that the application is not safe, the application is not installed on the user's device. Instead, the user is warned that the application is not safe at block 312, and the method proceeds to block 316 and ends.

Additional processes also may be included, and it should be understood that the processes depicted in FIG. 3 represent illustrations, and that other processes may be added or existing processes may be removed, modified, or rearranged without departing from the scope and spirit of the present disclosure.

Figure 4:
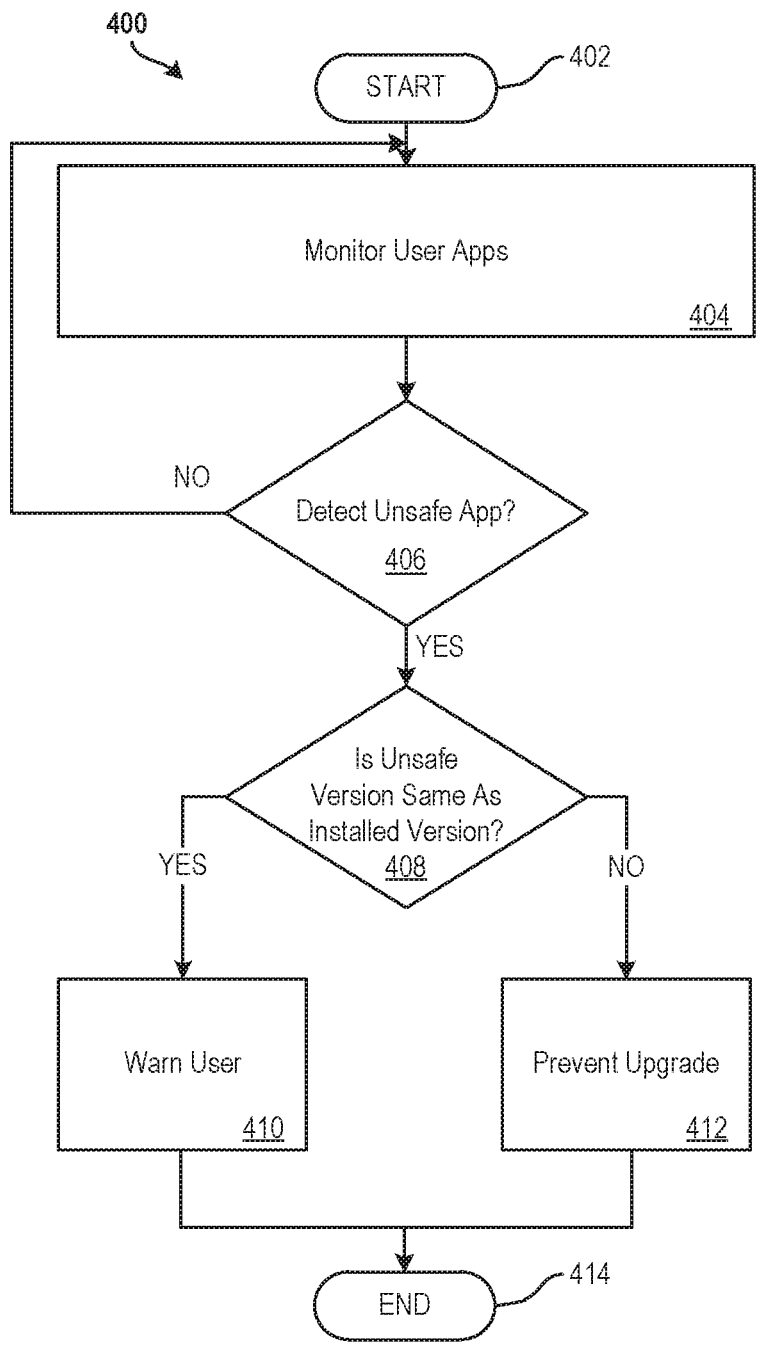
FIG. 4 illustrates a flow diagram of a method for determining whether an application is harmful prior to installation of the application on a processing system according to examples of the present disclosure.

FIG. 4 illustrates a flow diagram of a method 400 for determining whether an application is harmful prior to installation of the application on a processing system according to examples of the present disclosure. The method 400 begins at block 402 and continues to block 404.

At block 404, the method 400 comprises monitoring a user's applications that are installed on the user's device.

At decision block 406, the method 400 comprises determining if an application is detected as being unsafe or harmful based on the application store. If not, the method 400 continues monitoring at block 404. The application analysis module 110 looks up the list of installed applications on the user device 130 from the application store 120 and analyzes a plurality of reviews of each of the installed applications to determine if any of the installed applications listed is harmful. For example, User_1 installed the application App_X version_1 last year. Processing system 100 continues to monitor App_X from the application store 120 and determines whether the new version, version_2, of App_X is harmful based on the reviews of users who have installed version_2. Processing system 100 determines that App_X installed on the user device 130 is a potential unsafe application at decision block 406; it proceeds to decision block 408. However if the application analysis module 110 determines that the installed applications of the user device 130 are not harmful at decision block 406 based on the reviews in the application store 130, the method 400 proceeds to block 404 to continue to monitor user applications.

However, if an unsafe or harmful application is detected at decision block 406, then the method 400 comprises determining whether the unsafe or harmful version is the same as the version installed on the user device at decision block 408.

If the unsafe or harmful version is the same as the version installed on the user device, the user is warned at block 410. For example, User_2 previously installed the application App_X version_2. This version of App_X is determined to be harmful by processing system 100 based on the reviews of the application. The processing system 100 sends a warning message to User_2 to notify the user that App_X version_2 is potentially harmful to use. User_2 can make decision whether the user desires to stop using the application or even remove it from the user device 130. The method 400 proceeds to block 414 and ends. In examples, the method 400 continues monitoring at block 404.

If, however, the unsafe or harmful version is not the same as the version installed on the user device, the user is prevented from upgrading at block 412. The method 400 proceeds to block 414 and ends. In examples, the method 400 continues monitoring at block 404. For example, User_1 installed the application App_X version_1 last year. User_1 would like to upgrade to the new version, version_2, of App_X. However, version_2, of App_X has bad reviews and have harmed other users' devices in several incidents. When User_1 takes action to upgrade to version_2 of App_X, the processing system 100 prevent the user from upgrading to version_2.

Additional processes also may be included, and it should be understood that the processes depicted in FIG. 4 represent illustrations, and that other processes may be added or existing processes may be removed, modified, or rearranged without departing from the scope and spirit of the present disclosure.

Figure 5:
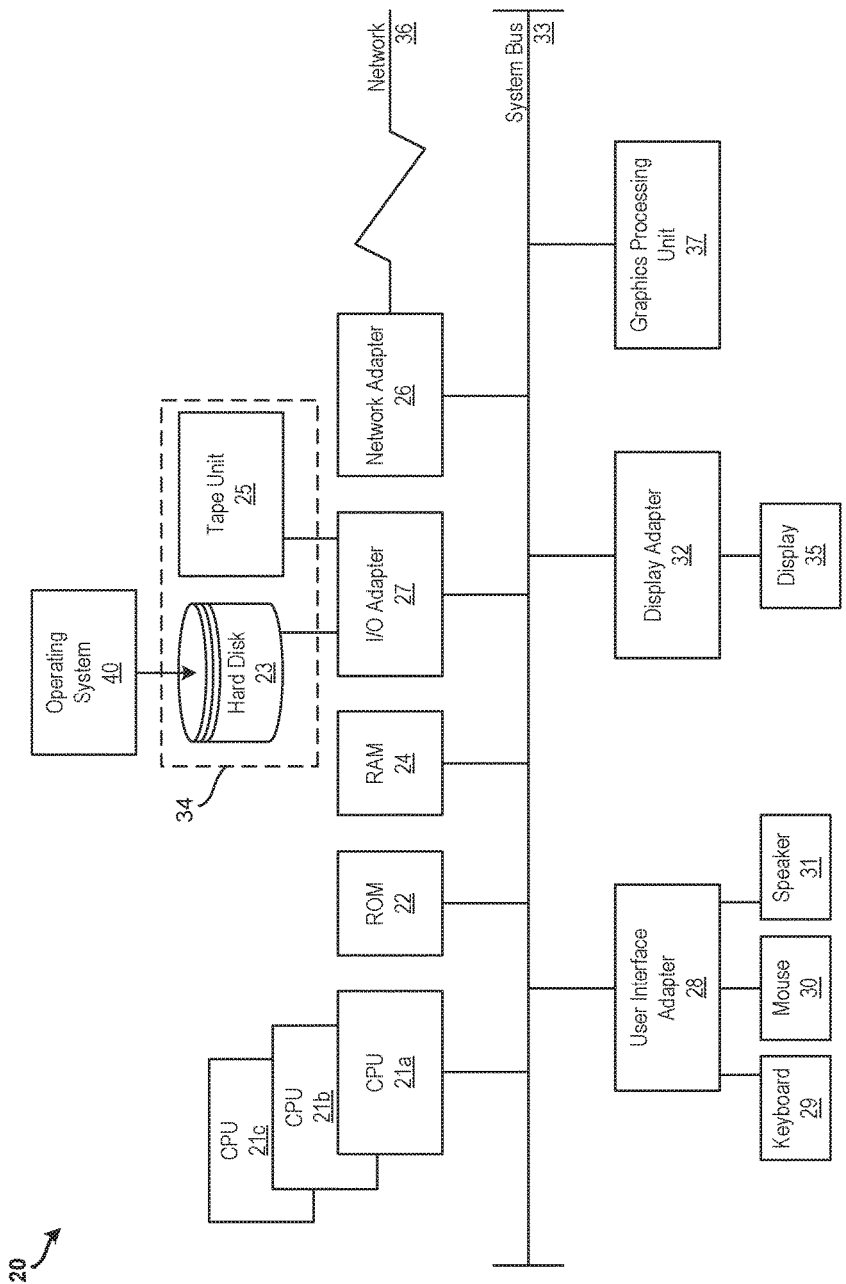
FIG. 5 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 5 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for detecting harmful applications prior to installation on a user device, the method comprising:
    analyzing, by a processing device, a plurality of reviews for a first version of an application and a second version of the application to associate a first subset of the plurality of reviews with the first version of the application based at least in part on a timestamp of the first version of the application and to associate a second subset of the plurality of reviews with the second version of the application based at least in part on a timestamp of the second version of the application;
    determining, by the processing device, whether the first version of the application is harmful based on the first subset of the plurality of reviews;
    determining, by the processing device, whether the second version of the application is harmful based on the second subset of the plurality of reviews;
    responsive to determining that the first version of the application is harmful based on the first subset of the plurality of reviews, preventing a user from installing the first version of the application; and
    responsive to determining that the second version of the application is harmful based on the second subset of the plurality of reviews, preventing the user from installing the second version of the application.

2. The computer-implemented method of claim 1, wherein analyzing the plurality of reviews for each version further comprises analyzing a plurality of ratings for the first version and the second version.

3. The computer-implemented method of claim 1, further comprising:
    monitoring an action of the user to determine whether the user has initiated an upgrade to a new version of an installed application on a user device.

4. The computer-implemented method of claim 3, further comprising:
    analyzing, by the processing device, a plurality of reviews for the new version of the installed application to determine, based on each of the plurality of reviews, whether the new version is harmful, wherein the plurality of reviews for the new version of the installed application relate only to the new version and not to the first version of the application or the second version of the application.

5. The computer-implemented method of claim 4, further comprising:
    responsive to determining that the new version is harmful, preventing the user from installing the new version.

6. The computer-implemented method of claim 1, wherein preventing the user from installing the first version or the second version further comprises warning the user that the particular version is harmful.

7. The computer-implemented method of claim 1, wherein analyzing the plurality of reviews for the first version of the application further comprises:
    identifying at least one review of the first subset of the plurality of reviews that indicates that the first version includes a harmful feature.

8. The computer-implemented method of claim 7, wherein analyzing the subset of the plurality of reviews for the application further comprises:
    presenting the at least one review of the first subset of the plurality of reviews to the user.

9. The computer-implemented method claim 7, wherein analyzing the plurality of reviews comprises performs a keyword search on the plurality of reviews to identify keywords that indicate the harmful feature.

10. The computer-implemented method of claim 1, further comprising:
    monitoring, by the processing system, an installed version of the application that is installed on the user device to determine whether the installed version of the application is harmful; and
    warning the user that the installed version of the application is harmful.

11. A system for detecting harmful applications prior to installation on a user device, the system comprising:
    a memory having computer readable instructions; and
    a processing device for executing the computer readable instructions, the computer readable instructions comprising:
        analyzing, by the processing device, a plurality of reviews for a first version of an application and a second version of the application to associate a first subset of the plurality of reviews with the first version of the application based at least in part on a timestamp of the first version of the application and to associate a second subset of the plurality of reviews with the second version of the application based at least in part on a timestamp of the second version of the application;
        determining, by the processing device, whether the first version of the application is harmful based on the first subset of the plurality of reviews;
        determining, by the processing device, whether the second version of the application is harmful based on the second subset of the plurality of reviews;
        responsive to determining that the first version of the application is harmful based on the first subset of the plurality of reviews, preventing a user from installing the first version of the application; and
        responsive to determining that the second version of the application is harmful based on the second subset of the plurality of reviews, preventing the user from installing the second version of the application.

12. The system of claim 11, wherein analyzing the plurality of reviews for each version further comprises analyzing a plurality of ratings for the first version and the second version.

13. The system of claim 11, wherein the computer readable instructions further comprise:

monitoring an action of the user to determine whether the user has initiated an upgrade to a new version of an installed application on a user device.

14. The system of claim 13, wherein the computer readable instructions further comprise:

analyzing, by the processing device, a plurality of reviews for the new version of the installed application to determine, based on each of the plurality of reviews, whether the new version is harmful, wherein the plurality of reviews for the new version of the installed application relate only to the new version and not to the first version of the application or the second version of the application.

15. The system of claim 14, wherein the computer readable instructions further comprise:

responsive to determining that the new version is harmful, preventing the user from installing the new version.

16. The system of claim 11, wherein preventing the user from installing the particular version further comprises warning the user that the first version or the second version is harmful.

17. The system of claim 11, wherein analyzing the plurality of reviews for the first version of the application further comprises:

identifying at least one review of the first subset of the plurality of reviews that indicates that the first version includes a harmful feature.

18. The system of claim 11, wherein the computer readable instructions further comprise:

monitoring, by the processing system, an installed version of the application that is installed on the user device to determine whether the installed version of the application is harmful; and warning the user that the installed version of the application is harmful.

19. A computer program product for detecting harmful applications prior to installation on a user device, the computer program product comprising:

a non-transitory computer readable storage medium having program instructions embodied therewith, the program instructions executable by a processing device to cause the processing device to:

analyze a plurality of reviews for a first version of an application and a second version of the application to associate a first subset of the plurality of reviews with the first version of the application based at least in part on a timestamp of the first version of the application and to associate a second subset of the plurality of reviews with the second version of the application based at least in part on a timestamp of the second version of the application;

determine whether the first version of the application is harmful based on the first subset of the plurality of reviews;

determine whether the second version of the application is harmful based on the second subset of the plurality of reviews;

responsive to determining that the first version of the application is harmful based on the first subset of the plurality of reviews, prevent a user from installing the first version of the application; and responsive to determining that the second version of the application is harmful based on the second subset of the plurality of reviews, a prevent the user from installing the second version of the application.

* * * * *